United States Patent [19]

Siegfried et al.

[11] Patent Number: 4,559,133
[45] Date of Patent: Dec. 17, 1985

[54] PROCESS FOR SEPARATING LIQUIDS FROM FINE GRAINED SOLIDS

[75] Inventors: Peter Siegfried, Lindenweg 3, 8521 Uttenreuth-Weiher, Fed. Rep. of Germany; Gerd Brunner, Roth-Eckersmühlen; Dieter Stützer, Marloffstein, both of Fed. Rep. of Germany

[73] Assignee: Peter Siegfried, Uttenreuth-Weiher, Fed. Rep. of Germany

[21] Appl. No.: 532,810

[22] Filed: Sep. 15, 1983

Related U.S. Application Data

[63] Continuation of Ser. No. 261,349, May 7, 1981, abandoned.

[30] Foreign Application Priority Data

May 9, 1980 [DE] Fed. Rep. of Germany ....... 3017876

[51] Int. Cl.$^4$ ................... C10G 21/20; C10G 21/10
[52] U.S. Cl. .............................. 208/177; 208/11 LE
[58] Field of Search ................... 208/11 LE, 177; 210/634

[56] References Cited

U.S. PATENT DOCUMENTS

| 3,607,717 | 9/1971 | Roach | 208/8 LE |
| 3,661,774 | 10/1972 | Masologites | 210/634 X |
| 4,056,462 | 11/1977 | Li et al. | 208/177 X |
| 4,090,957 | 5/1978 | Leonard | 210/634 X |
| 4,094,781 | 6/1978 | Snell et al. | 208/11 LE X |
| 4,162,965 | 7/1979 | Clapper | 208/177 |
| 4,177,134 | 12/1979 | Rhodes et al. | 208/177 |
| 4,180,456 | 12/1979 | Moll et al. | 208/177 |
| 4,227,994 | 10/1980 | Knebel et al. | 208/177 |
| 4,330,391 | 5/1982 | Rosenthal et al. | 208/8 LE |
| 4,341,619 | 7/1982 | Paska | 208/11 LE |

Primary Examiner—D. E. Gantz
Assistant Examiner—Glenn A. Caldarola
Attorney, Agent, or Firm—Sprung Horn Kramer & Woods

[57] ABSTRACT

A process is disclosed of separating fine solids from oil in which the solids are dispersed which comprising contacting said oil with a combination of a compressed above-critical gas and an entraining agent at such temperature and such pressure that the system consisting of the oil, entraining agent and above-critical gas constitutes a single phase, withdrawing and separating the so-withdrawn phase into a liquid phase rich in oil and a gas phase lean in oil, the single-phase mixture of oil, entraining agent and above-critical gas from the solids.

16 Claims, 3 Drawing Figures

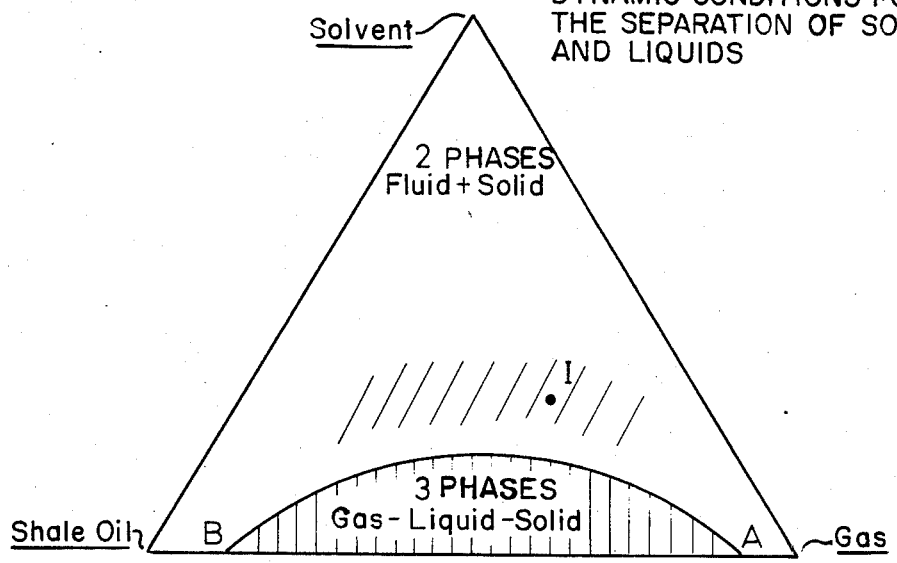
Fig.1 CONCENTRATION DIAGRAM REPRESENTING THE THERMODYNAMIC CONDITIONS FOR THE SEPARATION OF SOLIDS AND LIQUIDS
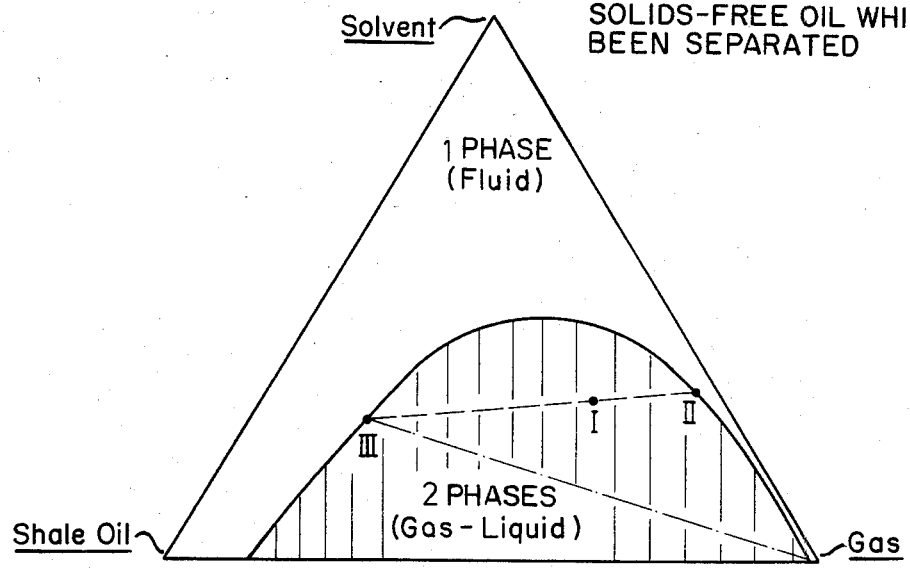
Fig.2 REPRESENTATION OF THE THERMODYNAMIC CONDITIONS FOR THE SEPARATION OF THE SOLIDS-FREE OIL WHICH HAS BEEN SEPARATED

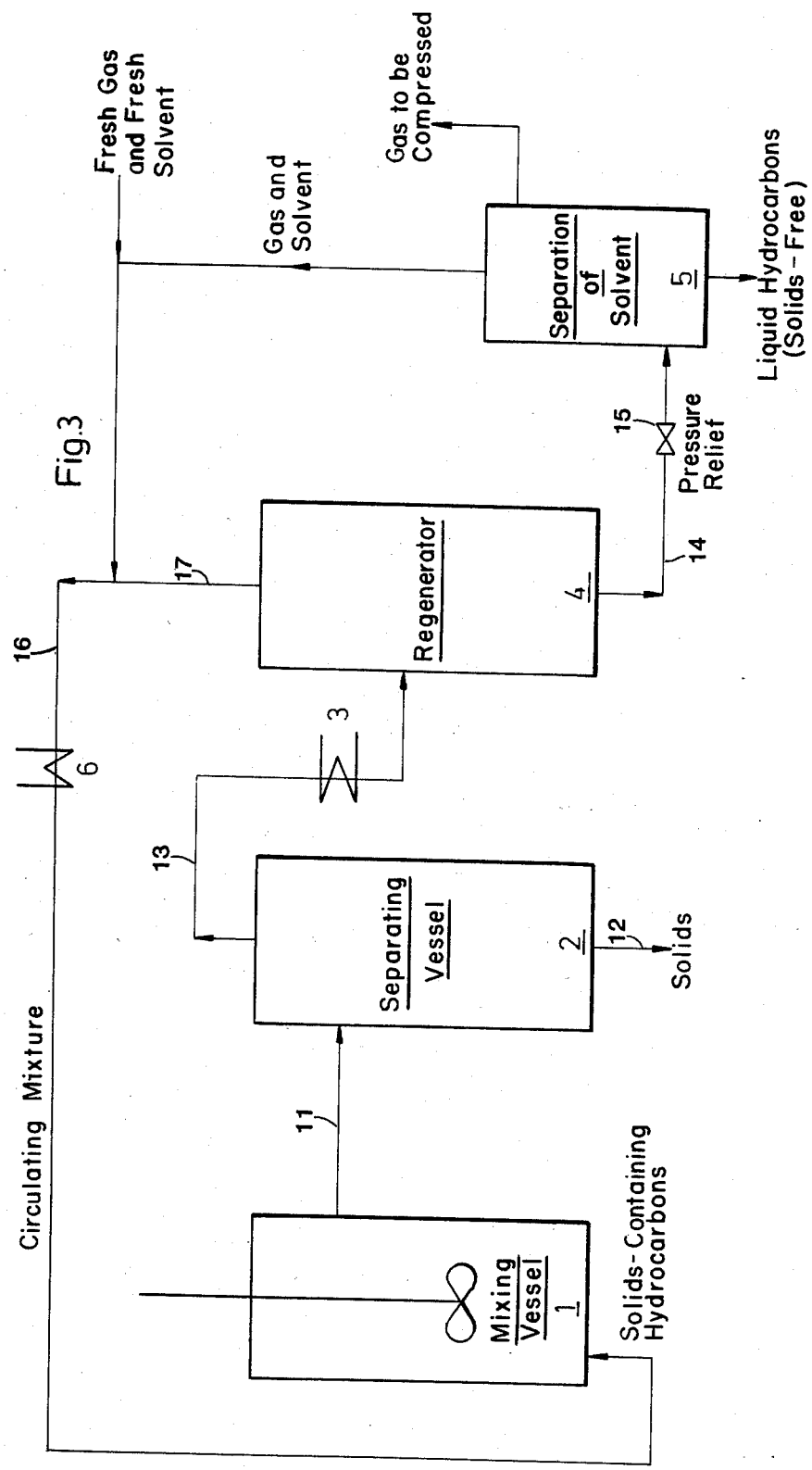

PROCESS FOR SEPARATING LIQUIDS FROM FINE GRAINED SOLIDS

This application is a continuation of application Ser. No. 261,349 filed May 7, 1981 now abandoned.

BACKGROUND OF THE INVENTION

This invention relates to a process for separating fine grained solids from liquids, especially oil such as shale oil. This invention relates to such a process carried out by forming a single phase mixture of such liquid, a treating agent and an above-critical gas.

DISCUSSION OF PRIOR ART

Dispersions of fine solids in liquids are very often encountered in technology. For instance, fine solid particles having a size of 0.1 to 5 microns are suspended in quantities up to about 40% by weight in oils recovered from oil sands or oil shale. To separate such solid particles, the high viscosity-oils are mixed with low-viscosity petroleum fractions to obtain a low-viscosity mixture, from which the solids are separated by means of centrifuges. As the fines are highly abrasive, the the centrifuges are subject to very heavy wear so that the separation of solids is so expensive that an economic recovery of oil may not be possible.

In addition, it has not been possible heretofore to put the Pott-Brosche process to commercial use because it was too difficult to separate the fine solids contained in the oil which was produced.

Suspensions of fine solids are also obtained in other fields. This applies, e.g., to waste oil, coal hydrogenation products, bituminous crude oils, high-asphalt crude oils, etc. The process may also be used for a direct recovery of oils from oil shale and tar sands.

It is an object of the invention to provide a process for the separation of fine solids from oils in which the solids are dispersed. It is an object to provide such a process which can be carried out without expensive machinery and in a simple manner without technical complications, particularly without excessive wear of the equipment which is used.

SUMMARY OF THE INVENTION

In accordance with the invention, a process of separating fine solids from oil in which the solids are dispersed is characterized in that the oil is treated with a combination of a compressed above-critical gas and an entraining agent at such temperature and pressure that the system comprising the oil, entraining agent and above-critical constitutes a single phase, the single-phase mixture of oil, entraining agent and above-critical gas is withdrawn from the solids, the separated single-phase mixture consisting of oil, entraining agent and above-critical gas is heated to separate the mixture into a liquid phase rich in oil and a gas phase lean in oil, and/or the separated single-phase mixture consisting of oil, entraining agent and above-critical gas is sufficiently pressure-relieved to separate the mixture into a liquid phase rich in oil and a gas phase lean in oil.

In this way the invention permits a separation of solids from liquids in that the liquid is dissolved under superatmospheric pressure in in a mixture consisting of an above-critical gas and a dissolving entraining agent. As a result, the dispersed fine solids settle within a relatively short time and a phase which is free from solids can be withdrawn without difficulty. The single-phase mixture contains the entraining agent in an amount of at least 10% by weight and preferably at least 15% by weight. In the single-phase mixture the above-critical gas is present in an amount of at least 20% by weight and preferably at least 30% by weight. The entraining agent can be present in the single phase mixture in an amount up to about 40% by weight while the mixture can contain the above critical gas in an amount of up to about 55% by weight.

For instance, when toluene is added to shale oil which contains fine solids in an amount of 20% by weight in order to reduce the viscosity of the oil and is contacted in a pressure vessel with a compressed hydrocarbon gas, such as ethane, propane, etc. at a temperature above critical temperature of the gas and a pressure amounting to a multiple of the critical pressure of the gas, and the entraining agent, such as toluene is present in a suitable proportion, this surprisingly results in a solids-free fluid phase, which contains the organic matter. The fine solids particles settle within a short time to the bottom of the pressure vessel. The fluid phase which is formed in the pressure vessel consists of the homogeneous mixture comprised of shale oil, entraining agent and compressed gas and has a density that is higher than the density of the pure compressed gas under the same conditions but lower than the density of the mixture of oil and entraining agent.

BRIEF DESCRIPTION OF DRAWINGS

Referring to the drawings,

FIG. 1 is a triangular concentration diagram in accordance with Gibbs;

FIG. 2 is a triangular concentration diagram showing the effects of the process on the concentration of the respective components; and FIG. 3 is a flow diagram showing a suitable mode for carrying out this process.

The thermodynamic conditions employed in accordance with the invention for the separation of solids and liquids and a desirable commercial embodiment of the process according to the invention will now be explained with reference to the drawing for a case in which the starting material consists of shale oil.

FIG. 1, the triangular concentration diagram in accordance with Gibbs, shows the phase boundary line of the system consisting of shale oil, entraining agent and above-critical gas. Mixtures having a composition between the phase boundary and that side of the triangle which connects the gas and shale oil corners will be decomposed into a liquid phase and a gas phase.

DESCRIPTION OF SPECIFIC EMBODIMENTS

Mixtures having a composition disposed outside the two-phase region thus defined consist of a single phase. In that case the solids constitute an additional disperse phase, which is not represented in the diagram. As the organic compounds are not soluble in the solids and the accompanying solids are insoluble in the organic phase, the solids do not influence the phase equilibrium and for this reason have not been taken into account in the concentration diagram. The particle size of the solids is, e.g., between 0.5 and 5 microns, e.g., up to 2 microns.

There is a miscibility gap between the shale oil and the gas. That miscibility gap will decrease as the content of entraining agent increases and will disappear if there is a relatively high content of entraining agent. If the composition of the mixture lies, e.g., in the vertically hatched concentration region and the pressure and temperature conditions are in the region to which the diagram is applicable, there will be two phases in addition to the solids. One phase will be rich in shale oil and the other will be rich in gas. The phase rich in shale oil will be described as a liquid phase and the phase rich in gas will be described as a gas phase.

FIG. 1 indicates also the preferred concentration region for the components of the mixture, namely, oil, entraining agent and gas. A suitable operating point is designated I. The corresponding area in the concentration diagram is x-hatched. It is apparent that the process is preferably carried out with entraining agent contents lying somewhat above the two-phase region because a relatively high oil content of the fluid phase can then be obtained in conjunction with a relatively low content of entraining agent so that the economy of the process will then be particularly high.

Later in the process according to the invention, the oil is separated by a temperature rise and/or by a pressure drop. The thermodynamic conditions for the separation of the solids-free oil are apparent from FIG. 2. The pressure drop and/or temperature rise which are effected will increase the concentration region in which the mixture is segregated into two phases. A suitable change of pressure and/or temperature will then have the result that the withdrawn fluid phase lies in the two-phase region shown in the concentration diagram of FIG. 2. This results in a phase rich in oil (represented by point III) and a phase which is rich in gas and poor in oil (represented by point II).

The phase rich in oil is withdrawn from the pressure vessel and then pressure-relieved. As a result of the pressure relief, the gas dissolved in the oil and part of the dissolved entraining agent is released. The remaining entraining agent dissolved in the oil is recovered by further processing in accordance with methods known per se, such as distillation, stripping etc.

The phase which is rich in gas and poor in oil is restored to its initial state (temperature $T_1$ and pressure $P_1$) and recycled. Above-critical gas and entraining agent are suitably added to make up for the loss which is due to the removal of the solids-free matter from the circulating system.

A suitable commercial embodiment of this invention will be described with reference to FIG. 3.

Solids suspended in oil, the entraining agent and the gas are fed into the mixing vessel 1 in suitable proportions, which can easily be ascertained by simple preliminary experiments. When the desired pressure and temperature have been adjusted, the contents of the vessel 1 are thoroughly mixed so that the oil, entraining agent and gas form a single fluid phase. The mixture is then transferred via line 11 into the separating vessel 2, where the dispersed fine solids settle within short time. When the solids and fluid phase have separated, the solids at the bottom of the separating vessel 2 are removed via line 12. The fluid phase is conducted in line 13 through an indirect heater 3 into a regenerator 4. By a temperature rise, the two-phase region is sufficiently enlarged so that the fluid phase segregates into a liquid phase rich in oil and into a gas phase rich in gas. The gas phase is withdrawn via line 17 and introduced into recycle line 16. The liquid phase which is rich in oil is withdrawn from the bottom of the regenerator 4 via line 14 and is pressure-relieved at valve 15 and then fed into vessel 5 for the separation of the gas and entraining agent which have been dissolved. The dissolved gas and entraining agent are recompressed and recycled via line 16 through a heat exchanger 6.

For practical and economic reasons it may be desirable to effect the separation of oil and solids in a plurality of stages. However, this does not influence the process conditions in the mixing vessel and regenerator. The process in accordance with the invention can be carried out as a countercurrent operation in a column in which mixing stages and separating stages are combined in one unit.

In a preferred embodiment of the process according to the invention, the single-phase mixture is formed at a temperature between the critical temperature of the gaseous component and twice and preferably one and a half times said critical temperature. A range between the critical temperature and a temperature 100° C. higher than the critical temperature is particularly preferred.

Also, in a preferred embodiment of the process according to the invention the pressure applied to form the single-phase mixture is in the range from the critical pressure of the gaseous component to ten times, particularly four times, said critical pressure. A pressure range from the critical pressure of the gas to three times the critical temperature of the gas is particularly preferred.

In general, suitable pressure and temperature conditions can easily be determined in each case by a person skilled in the art by means of simple preliminary tests.

The transformation of the single-phase mixture to a two-phase system is preferably effected at least mainly by a temperature rise. An intentional pressure drop in the system should be avoided. In a continuous cyclic process, technically inevitable pressure drops are preferably compensated in that the pressure is increased at a suitable point of the process in a manner known, per se, e.g., by means of a circulating pump. The highest pressure is suitably maintained in the mixing vessel, of course.

The nature of the dispersed fine solids to be separated in the process according to the invention is not critical. Oils which have been recovered from oil sand or oil shale will generally contain clays, multilayer clays, kaoline, i.e., essentially aluminum silicate compounds. Waste oils contain primarily fine metal particles and carbonaceous combustion residues. Coal hydrogenation products contain mainly extremely fine coal particles in dispersion.

The above-critical gas may particularly consist of any of the following compounds: An aliphatic hydrocarbon having preferably 1 to 10 carbon atoms; an olefinic hydrocarbon having preferably 2 to 4 carbon atoms; an halogenated hydrocarbon, which particularly contain chlorine and/or fluorine and have preferably 1 to 4 carbon atoms; an aromatic hydrocarbon, which is preferably mononuclear and which may be substituted with an alkyl group having 1 to 4, particularly 1 or 2, carbon atoms; carbon dioxide; sulfur dioxide; nitrogen; hydrogen sulfide; hydrogen; carbon monoxide or ammonia. Specific examples of such gases are methane, ethane, propane, butane, pentane, hexane, heptane, nonane, decane, toluene, xylene, ethylene, propylene, monochlorotrifluoromethane, methyl chloride, trichloroethane, dichlorodifluoroethane and similar compounds as well as hydrogen cuts having boiling temperatures between 60° and 120° C.

The following entraining agents may preferably be used in the process according to the invention: Aliphatic hydrocarbons having 4 to 20 carbon atoms; alicyclic hydrocarbons having preferably 5 or 6 carbon atoms, which may be substituted by one or more alkyl groups having preferably 1 to 3 carbon atoms; halogenated aliphatic hydrocarbons, which preferably contain chlorine and have preferably 1 to 4 carbon atoms; hydrocarbons, which are preferably mononuclear or binuclear and may be substituted with one or more alkyl groups, which preferably have 1 or 2 carbon atoms, or with an amino group, and which may be aromatic or entirely or partly hydrogenated, particularly monohydric aliphatic alcohols having preferably 1 to 5 carbon atoms, aliphatic ketones having particularly up to 5 carbon atoms, alkyl esters of aliphatic acids, preferably with 1 to 6 carbon atoms in the alcohol component, heterocyclic compounds and dimethyl sulfoxide.

Suitable entraining agents may generally consist of solvents having boiling points in the range from room temperature to 250° C., particularly mixed hydrocarbons which are rich in branched molecules and cyclic hydrocarbons and/or rich in aromatic compounds. The following specific examples may be mentioned: Benzene, toluene, xylene, hexane, decane, aniline, furan, dimethyl formamide, acetone, pyridine, methanol, ethanol, propanol, butanol, amyl alcohol, methyl acetate, ethyl acetate, propyl acetate, butyl acetate, tetralin, tetrahydrofuran, piperidine, chloroform, trichloroethylene, carbon tetrachloride, cyclohexane, methyl cyclohexane, methyl ethyl ketone and similar compounds as well as mixed hydrocarbons having a boiling range of 20° to 100° C., 100° to 150° C. or 150° to 200° C. or platformate cuts having a boiling range of 90° to 200° C., preferably 100° to 150° C.

It will be understood that the above-critical gas and the entraining agent may advantageously consist of mixtures of the compounds or classes of compounds stated above. The selection of the above-critical gas and of the entraining agent in a given case will depend on the starting materials and particularly on the desired process parameters.

Compared with other processes of separating substances with the aid of compressed above-critical gases but without entraining agents, the process according to the present invention affords particularly the following advantages:

(1) the loading of the fluid phase with the oil to be separated may be almost as high as may be desired so that a much higher economy can be achieved;
(2) only relatively small changes of pressure and/or temperature are required for the separation;
(3) the separation can be effected in a wide temperature range by a suitable selection of the combination of above-critical gas and entraining agent;
(4) certain partial quantities of the oil can be selectively separated with the aid of suitable entraining agents so that specific components of the oil cna be preferentially dissolved.

The process according to the invention will now be explained more fully with reference to some examples, to which the invention is not restricted:

EXAMPLE 1

300 grams of a high-viscosity shale oil containing 20% by weight solids having particle sizes between 0.1 and 2 microns were mixed in a pressure vessel at a weight ratio of 1:3.3 and at 130° C. and a pressure of 130 bar with a mixture of 40% by weight toluene and 60% by weight ethylene. The resulting mixture was fed to a separating vessel and permitted to rest for 4 minutes, after which a solids-free mixture which contained 20% by weight oil was withdrawn. After degasification, a mixture of 68% by weight solids, 20% by weight oil and 12% by weight toluene was obtained. The composition of the sample taken at the bottom did not correspond to a phase equilibrium because an appreciable volume of the fluid phase was also withdrawn owing to the loose aggregation of solids.

To separate the oil, the mixture of shale oil, toluene and ethylene was heated to 200° C. under a pressure of 130 bar. A liquid mixture consisting of 210 grams shale oil and 45 grams toluene was obtained after degasification. The gas phase still contained 1% by weight shale oil and 35% by weight toluene in solution.

EXAMPLE 2

250 grams of an oil residue which contained about 25% by weight solids having a particle size between 0.2 and 2 microns were mixed in a pressure vessel at a weight ratio of about 1:1.7 and at a temperature of 120° C. and a pressure of 80 bar with a mixture of 30% by weight benzene and 70% by weight propane. After settling period of rest of 5 minutes, a solids-free mixture of oil, benzene and propane, containing 40% by weight oil, was withdrawn. After degasification, the mixture that had settled to the bottom was composed of 65% by weight solids, 20% by weight oil and 15% by weight benzene.

To separate the oil, the mixture of oil, benzene and propane was heated to 200° C. under a pressure of 80 bar. A liquid mixture consisting of 155 grams oil and 30 grams benzene was obtained after degasification. The gas phase still contained about 5% by weight oil and 25% by weight benzene dissolved in the propane.

EXAMPLE 3

250 grams of a high-viscosity shale oil which contained about 30% by weight solids having a particle size between 0.1 and 5 microns were mixed at a weight ratio of about 1:2.2 and at a temperature of 150° C. and under a pressure of 100 bar with a mixture of 40% by weight of a platformate cut having a boiling range of 100° to 150° C. and 60% by weight propane. After a settling period of rest of 5 minutes, a solids-free mixture of oil, platformate cut and propane, which contained about 30% by weight oil, was withdrawn. After degasification, the mixture which had settled to the bottom was composed of about 75% by weight solids, 15% by weight oil and 10% by weight platformate cut.

To separate the oil, a mixture of oil, platformate cut and propane was heated to 220° C. at a pressure of 100 bar. Mixed liquids consisting of 150 grams shale oil and 30 grams platformate were obtained after degasification. The gas phase still contained 2% by weight shale oil and 36% by weight platformate dissolved in the propane.

EXAMPLE 4

250 grams of a viscous oil obtained by the hydrogenation of coal and containing about 40% by weight solids having a particle size between 0.1 and 5 microns were mixed in a pressure vessel at a weight ratio of 1:2.5 and at a temperature of 180° C. and a pressure of 90 bar with a mixture of 30% by weight mixed hydrocarbons having a boiling range of 90° to 150° C. and 70% by weight butane. After a settling time of rest of 5 minutes, a solids-free mixture of oil, hydrocarbon fraction and butane, which contained about 18% by weight oil, was withdrawn. After degasification, the mixture which had settled to the bottom was composed of about 83% by weight solids, 9% by weight oil and 8% by weight hydrocarbon fraction.

To separate the oil, the mixture of oil, hydrocarbon fraction and butane was heated to 250° C. under a pressure of 90 atm. Mixed liquids consisting of 129 grams oil and 30 grams hydrocarbon fraction were obtained after degasification. The gas phase still contained about 2% by weight oil and 27% by weight hydrocarbon fraction dissolved in the butane.

What is claimed is:

1. In a process of separating fine solids from oil in which the solids are dispersed, wherein said oil is mixed in a mixing zone with a solvent, transferring the resultant mixture in a separation zone, settling the fine solids below a remaining fluid phase, withdrawing the settled fine solids from said separation zone and feeding the fluid phase into a regeneration zone, in said regeneration zone subjecting said fluid phase to an increase in temperature and/or a reduction of pressure to separate out a first phase rich in oil and a second phase, withdrawing the first phase and recycling the second phase to said mixing zone, the improvement wherein the solvent comprises a first agent and a second agent, the first agent is at least one entraining agent selected from the group consisting of benzene, toluene, methanol, ethanol, an aliphatic ketone, a mixture of hydrocarbons having a boiling range of 20° to 100° C., a mixture of hydrocarbons having a boiling range of 100° to 150° C. and a mixture of hydrocarbons having a boiling range of 150° to 200° C., the second agent is at least one gas selected from the group consisting of carbon dioxide, nitrogen, hydrogen, carbon monoxide, ammonia, methane, ethane, ethylene, propane and butane, the gas being compressed and in super-critical condition wherein the gas is at a temperature above the critical temperature and at a pressure above critical pressure, said mixture of oil, super-critical gas and entraining agent containing 10 to 40 percent by weight of said first agent and 20 to 55 percent by weight of said second agent, maintaining the mixture of oil, super-critical gas and entraining agent at a temperature and a pressure above the critical state where said mixture of oil, super-critical gas and entraining agent constitutes a single fluid phase in the separation zone, segregating in the regenerating zone the fluid phase into a liquid phase and a gas phase containing at least one of the agents and subjecting the recycled gas and the entraining agent to conditions of pressure and temperature in order to reconstitute the super-critical condition.

2. A process according to claim 1, wherein the mixture of oil, super-critical gas and entraining agent contains 10 to 15 percent by weight of the entraining agent.

3. A process according to claim 1, wherein the mixture of oil, super-critical gas and entraining agent contains 20 to 30 percent by weight of the super-critical gas.

4. A process according to claim 1, wherein the oil is shale oil and the entraining agent is toluene.

5. A process according to claim 1, wherein the temperature in the separating zone is 120° C. to 180° C.

6. A process according to claim 1, wherein the pressure in the separating zone is 80 bar to 130 bar.

7. A process according to claim 5 wherein the temperature in the regeneration zone is 200°–250° C.

8. A process according to claim 1, wherein the single-phase mixture comprising oil, entraining agent and super-critical gas is formed at a temperature between the critical temperature of the gas component and twice said critical temperature.

9. A process according to claim 8, wherein said single-phase mixture is formed at a temperature between the critical temperature of the gas component and one and a half times said critical temperature.

10. A process according to claim 8, wherein said single-phase mixture is formed at a temperature between the critical temperature of the gas and a temperature 100° C. higher than said critical temperature.

11. A process according to claim 1, wherein the single-phase mixture consisting of oil, entraining agent and super-critical gas is formed under a pressure in the range from the critical pressure of the gas to ten times said critical pressure.

12. A process according to claim 11, wherein said single phase mixture is formed under a pressure in the range from the critical pressure of the gas to three times said critical pressure.

13. A process according to claim 1, wherein said second agent is selected from the group consisting of carbon dioxide, nitrogen, hydrogen, carbon monoxide, ammonia, methane, ethane, propane and butane.

14. A process according to claim 13, wherein said second agent is selected from the group consisting of carbon dioxide, nitrogen, hydrogen, carbon monoxide, ammonia, methane, and ethane.

15. A process according to claim 14, wherein said second agent is selected from the group consisting of carbon dioxide, nitrogen, hydrogen, carbon monoxide and ammonia.

16. A process according to claim 1, wherein said first agent is selected from the group consisting of methanol, ethanol and an aliphatic ketone.

* * * * *

UNITED STATES PATENT AND TRADEMARK OFFICE
CERTIFICATE OF CORRECTION

PATENT NO.  : 4,559,133

DATED       : December 17, 1985

INVENTOR(S) : Siegfried Peter et al.

It is certified that error appears in the above-identified patent and that said Letters Patent are hereby corrected as shown below:

Title Page, after "Inventors:"  Delete "Peter Siegfried" and substitute --Siegfried Peter--

Signed and Sealed this

Sixteenth Day of September 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,559,133

DATED : December 17, 1985

INVENTOR(S) : Siegfried Peter et al.

It is certified that error appears in the above-identified patent and that said Letters Patent is hereby corrected as shown below:

On the title page assignee should read

--(73) Assignee: Siegfried Peter, Feb. Rep. of Germany --.

Signed and Sealed this

Eleventh Day of November, 1986

Attest:

DONALD J. QUIGG

Attesting Officer      Commissioner of Patents and Trademarks